United States Patent
Wada

(10) Patent No.: US 9,805,109 B2
(45) Date of Patent: Oct. 31, 2017

(54) COMPUTER, CONTROL DEVICE FOR COMPUTER SYSTEM, AND RECORDING MEDIUM

(71) Applicant: Hitachi, Ltd., Tokyo (JP)

(72) Inventor: Yosuke Wada, Yokohama (JP)

(73) Assignee: HITACHI, LTD., Tokyo (JP)

( * ) Notice: Subject to any disclaimer, the term of this patent is extended or adjusted under 35 U.S.C. 154(b) by 309 days.

(21) Appl. No.: 14/424,375

(22) PCT Filed: Dec. 28, 2012

(86) PCT No.: PCT/JP2012/084020
§ 371 (c)(1),
(2) Date: Feb. 26, 2015

(87) PCT Pub. No.: WO2014/102997
PCT Pub. Date: Jul. 3, 2014

(65) Prior Publication Data
US 2015/0220612 A1    Aug. 6, 2015

(51) Int. Cl.
*G06F 7/00*    (2006.01)
*G06F 17/30*   (2006.01)
*G06F 11/20*   (2006.01)

(52) U.S. Cl.
CPC .... *G06F 17/30584* (2013.01); *G06F 11/2094* (2013.01); *G06F 17/30194* (2013.01)

(58) Field of Classification Search
CPC ......... G06F 17/30194; G06F 17/30584; G06F 17/30575; G06F 17/30283; G06F 11/2094;

(Continued)

(56) References Cited

U.S. PATENT DOCUMENTS 6,886,032 B2 *  4/2005  Watkins .............. G06F 11/2097
                                                    709/216
7,792,067 B2 *  9/2010  Sheu ................... H04W 76/046
                                                    370/311

(Continued)

FOREIGN PATENT DOCUMENTS

JP    2012-048424 A    3/2012
WO    2012/140957 A1   10/2012

OTHER PUBLICATIONS

Object Replication strategies in content distribution networks, Kangasharju et al; Published by Elsevier Science B.V. 2002.*

(Continued)

*Primary Examiner* — Daniel Kuddus
(74) *Attorney, Agent, or Firm* — Volpe and Koenig, P.C.

(57) ABSTRACT

A computer, which is communicably connected to a plurality of computers having respective storage areas for storing data and in which second data that is replication of first data arranged in a storage area of own computer is arranged in storage areas of other computers, and the computer holds capacities of the storage areas of the respective computers and determines first data ranges for arranging the first data in the storage areas of the own computer and the plurality of other computers in accordance with the capacities, determines a second data range that is a largest data range or has a largest capacity, with, as a starting point, a data range that is different from a largest data range or a data range having a largest capacity in the first data ranges, and arranges the data in the storage areas of the respective computers.

7 Claims, 16 Drawing Sheets

| SERVER ID | MASTER DATA BLOCK ID | MASTER DATA RANGE | REPLICATED DATA BLOCK ID | SERVER ID | MASTER DATA BLOCK ID | MASTER DATA RANGE | REPLICATED DATA BLOCK ID |
|---|---|---|---|---|---|---|---|
| A | 1 | 1~150 | 11 | C | 8 | 751~900 | 3 |
|   |   |   |   |   | 9 | 901~950 | 4 |
|   | 2 | 151~200 | 12 |   | 10 | 951~1000 | 5 |
|   | 3 | 201~300 | 13 |   | 11 | 1001~1050 | 6 |
|   | 4 | 301~350 | 14 |   | 12 | 1051~1100 | 7 |
| B | 5 | 351~400 | 15 | D | 13 | 1101~1350 | 8 |
|   | 6 | 401~550 | 1 | E | 14 | 1351~1400 | 9 |
|   | 7 | 551~750 | 2 |   | 15 | 1401~1500 | 10 |

(58) Field of Classification Search
CPC . G06F 3/06; G06F 12/00; G06F 13/10; G06F 3/0614; G06F 11/2053
USPC ....... 707/623, 634, 626, 633, 635, 637, 640, 707/758; 711/156, 171
See application file for complete search history.

(56) References Cited

U.S. PATENT DOCUMENTS

| | | | | |
|---|---|---|---|---|
| 8,032,729 B2* | 10/2011 | Maki | .................... | G06F 9/5016 711/100 |
| 8,094,813 B2* | 1/2012 | Ciet | .................... | H04L 9/00 380/28 |
| 8,098,952 B2* | 1/2012 | Zhang | .................... | H04N 5/21 341/107 |
| 8,437,870 B2* | 5/2013 | Tsai | .................... | G01R 31/2894 700/103 |
| 8,588,423 B2* | 11/2013 | Pang | .................... | H04L 9/0833 380/255 |
| 9,064,438 B2* | 6/2015 | Hwang | .................... | G09G 5/003 |
| 2002/0015336 A1* | 2/2002 | Watkins | .................... | G06F 11/2094 365/200 |
| 2005/0031319 A1* | 2/2005 | Fujita | .................... | G11B 20/10 386/240 |
| 2005/0257014 A1* | 11/2005 | Maki | .................... | G06F 3/0605 711/162 |
| 2006/0036825 A1* | 2/2006 | Maki | .................... | G06F 9/5016 711/165 |
| 2007/0168361 A1* | 7/2007 | Hirakawa | .................... | G06F 11/2064 |
| 2007/0283089 A1* | 12/2007 | Tsurudome | .................... | G06F 3/0604 711/114 |
| 2009/0055593 A1* | 2/2009 | Satoyama | .................... | G06F 3/0608 711/134 |
| 2009/0077557 A1* | 3/2009 | Ichikawa | .................... | G06F 11/3485 718/102 |
| 2012/0321152 A1* | 12/2012 | Carroll | .................... | G06T 7/0014 382/128 |

OTHER PUBLICATIONS

Kangasharju, Jussi, et al., "Object Replication Strategies in Content Distribution Networks", Computer Communications, Elsevier Science Publishers BV, Amsterdam, vol. 25, No. 4, Mar. 1, 2002, pp. 376-383.

European Search Report for European Patent Application No. 12890841.5, dated Jul. 25, 2016.

* cited by examiner

[FIG. 1]
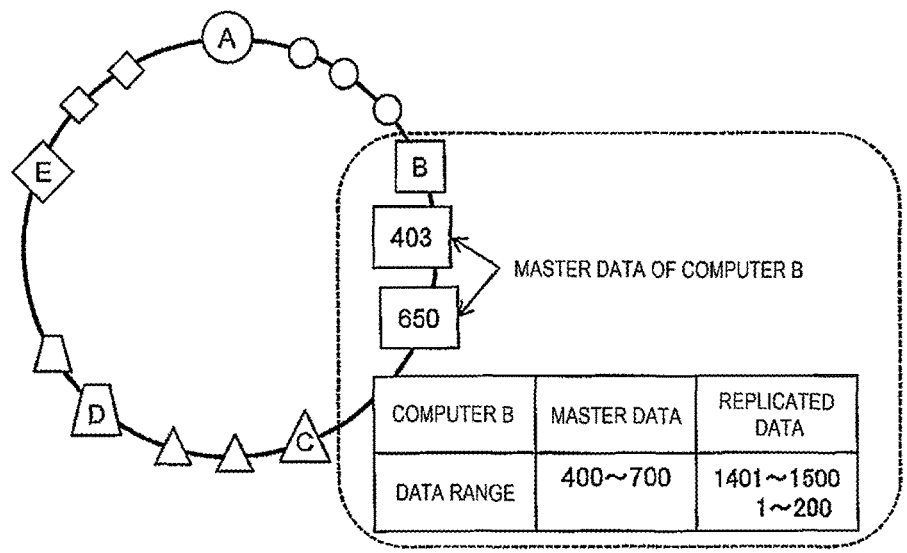
[FIG. 2]
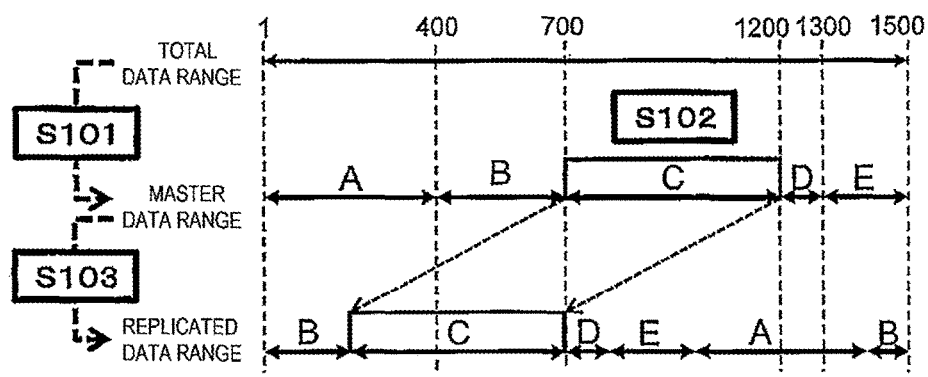

[FIG. 3]
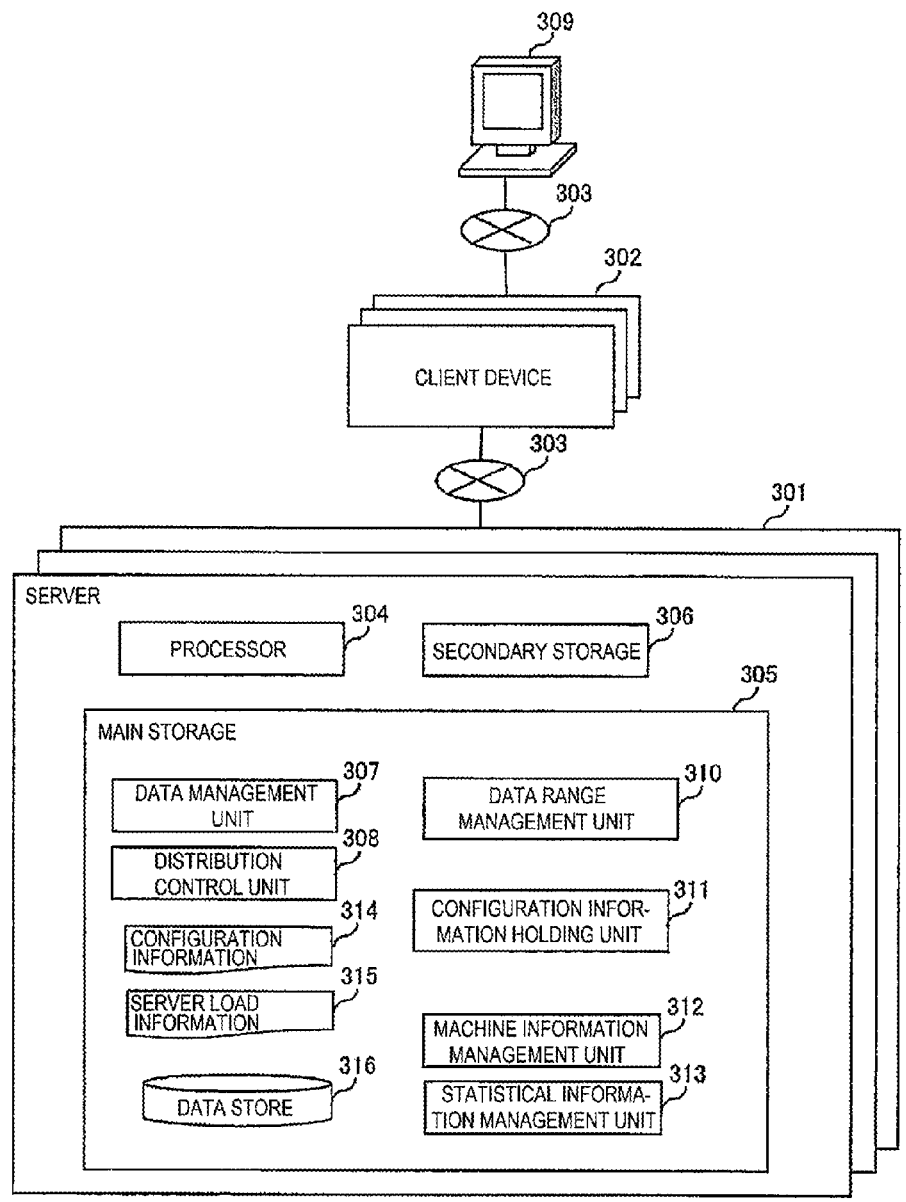

[FIG. 4A]

| SERVER ID | DATA RANGE | |
|---|---|---|
| | MASTER | REPLICATION |
| A | 1~400 | 1001~1400 |
| B | 401~700 | 1401~1500 1~200 |
| C | 701~1200 | 201~700 |
| D | 1201~1300 | 701~800 |
| E | 1301~1500 | 801~1000 |

[FIG. 4B]

| SERVER ID | MASTER DATA 411 BLOCK ID | MASTER DATA 412 RANGE | REPLICATED DATA 413 BLOCK ID | SERVER ID | MASTER DATA 411 BLOCK ID | MASTER DATA 412 RANGE | REPLICATED DATA 413 BLOCK ID |
|---|---|---|---|---|---|---|---|
| A | 1 | 1~150 | 11 | C | 8 | 751~900 | 3 |
| | | | | | 9 | 901~950 | 4 |
| | 2 | 151~200 | 12 | | 10 | 951~1000 | 5 |
| | 3 | 201~300 | 13 | | 11 | 1001~1050 | 6 |
| | 4 | 301~350 | 14 | | 12 | 1051~1100 | 7 |
| B | 5 | 351~400 | 15 | D | 13 | 1101~1350 | 8 |
| | 6 | 401~550 | 1 | E | 14 | 1351~1400 | 9 |
| | 7 | 551~750 | 2 | | 15 | 1401~1500 | 10 |

[FIG. 4C]

| | SERVER ID | A | B | C | D | E |
|---|---|---|---|---|---|---|
| 420 | | | | | | |
| 423 | MEMORY SIZE | 4GB | 3GB | 5GB | 1GB | 2GB |
| 425 | DATA SIZE | 1GB | 1GB | 1.5GB | 0.5GB | 0.5GB |

315

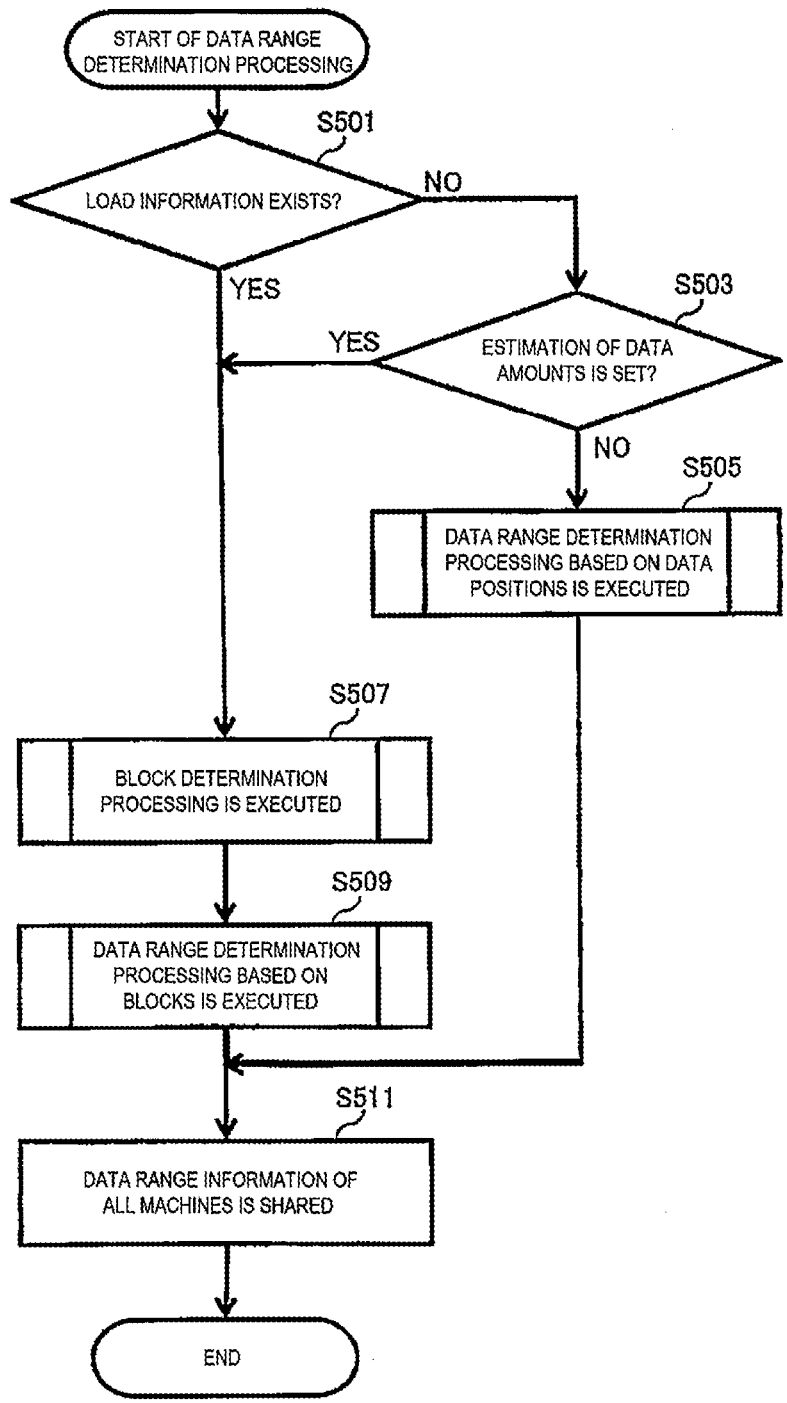

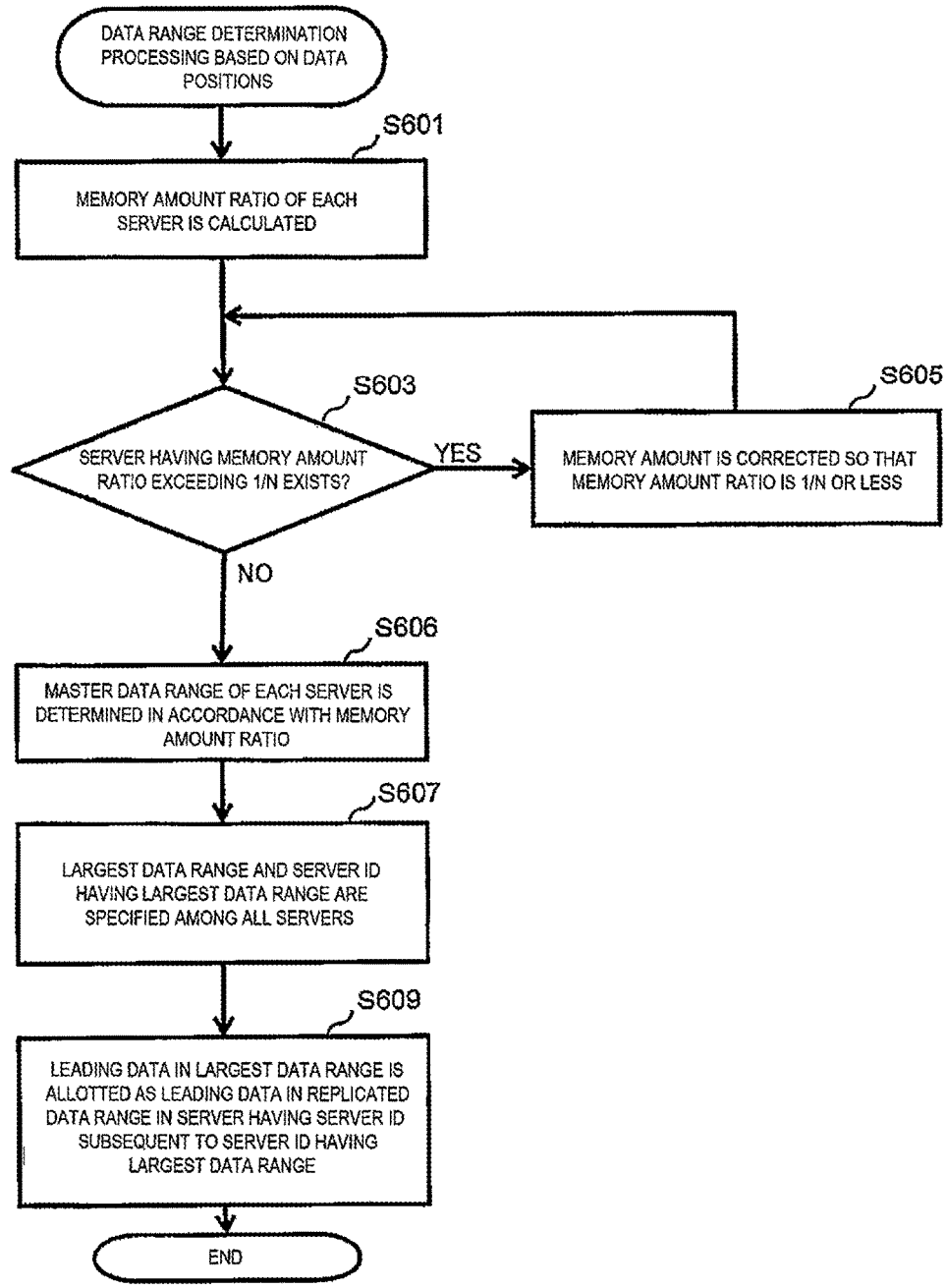

[FIG. 6B]
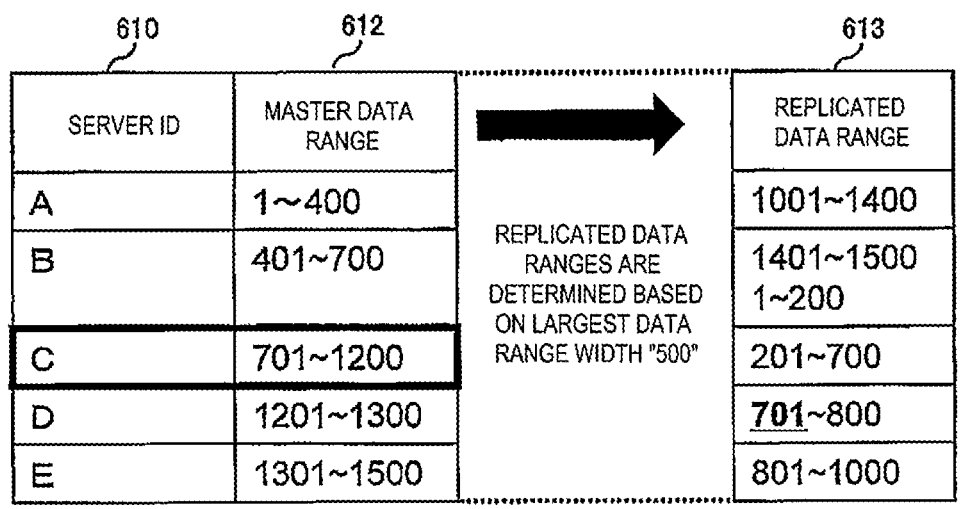

[FIG. 7]
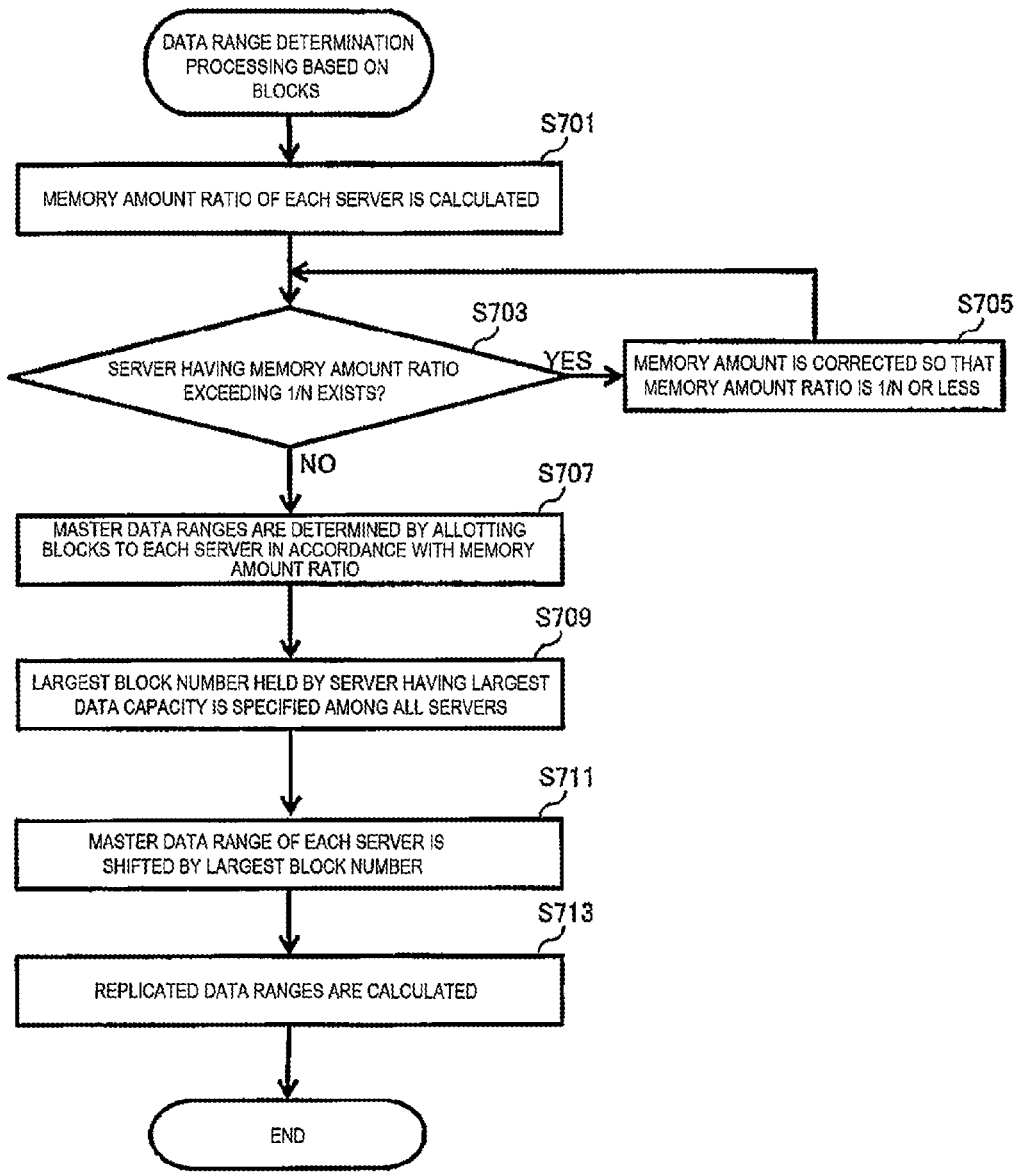

[FIG. 8A]
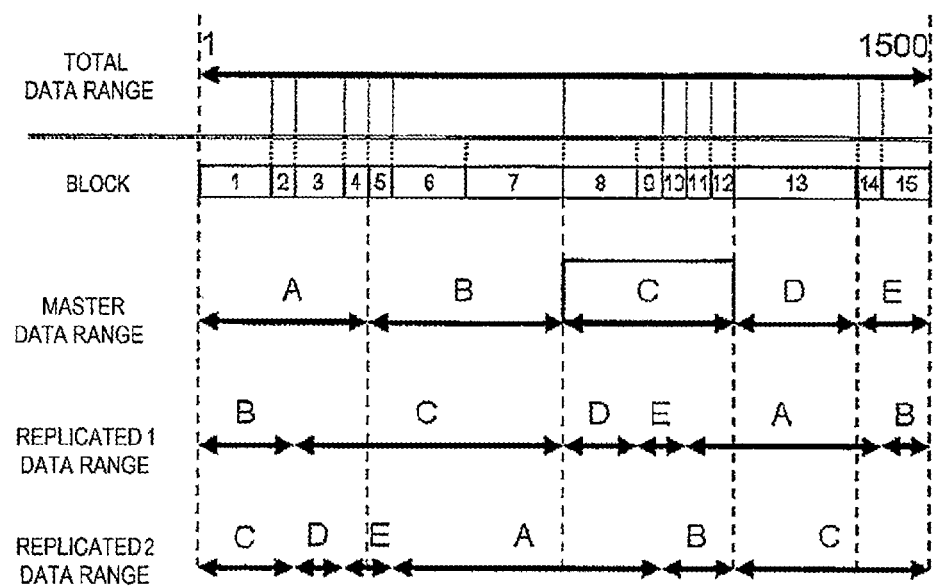

[FIG. 8B]

| SERVER ID | MASTER DATA 811 | MASTER DATA 812 | REPLICAT-ED DATA 1 813 | REPLICAT-ED DATA 2 814 314 |
|---|---|---|---|---|
| | BLOCK ID | DATA RANGE | BLOCK ID | BLOCK ID |
| A | 1 | 1~150 | 11~13 | 6~9 |
| | 2 | 151~200 | | |
| | 3 | 201~300 | | |
| | 4 | 301~350 | | |
| B | 5 | 351~400 | 15, 1~2 | 10~12 |
| | 6 | 401~550 | | |
| | 7 | 551~750 | | |
| C | 8 | 751~900 | 3~7 | 13~15, 1~2 |
| | 9 | 901~950 | | |
| | 10 | 951~1000 | | |
| | 11 | 1001~1050 | | |
| | 12 | 1051~1100 | | |
| D | 13 | 1101~1350 | 8 | 3 |
| E | 14 | 1351~1400 | 9~10 | 4~5 |
| | 15 | 1401~1500 | | |

[FIG. 9]
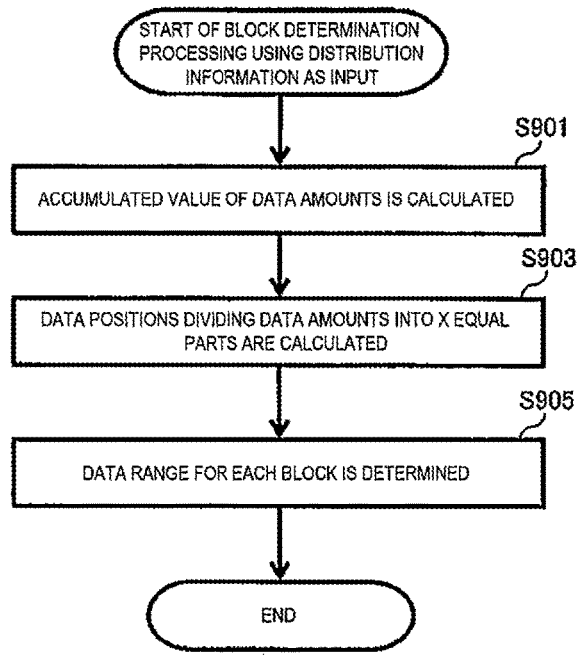
[FIG. 10A]
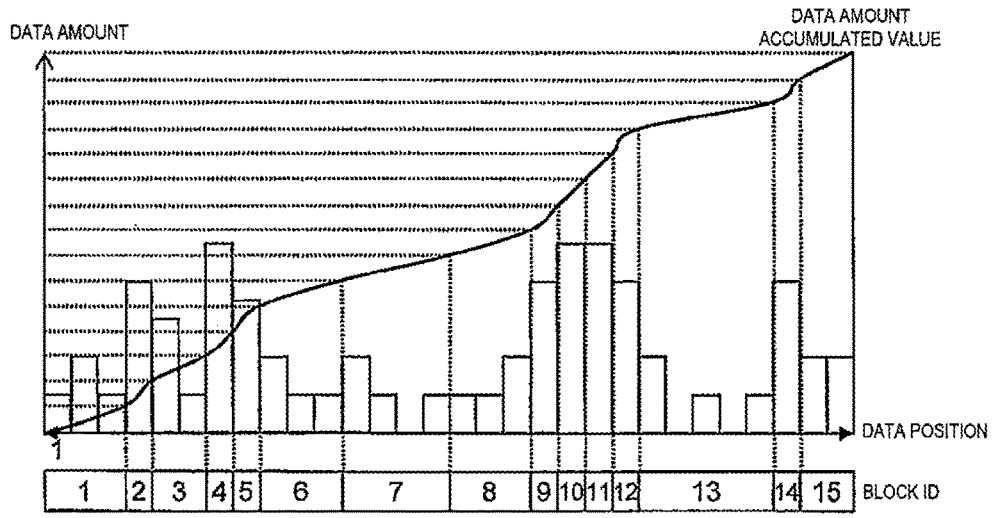

[FIG. 10B]
| BLOCK ID | DATA RANGE | BLOCK ID | DATA RANGE |
|---|---|---|---|
| 1 | 1~120 | 9 | 835~934 |
| 2 | 121~240 | 10 | 935~1034 |
| 3 | 241~360 | 11 | 1035~1134 |
| 4 | 361~460 | 12 | 1135~1220 |
| 5 | 461~550 | 13 | 1221~1280 |
| 6 | 551~640 | 14 | 1281~1380 |
| 7 | 641~734 | 15 | 1381~1500 |
| 8 | 735~834 | | |
[FIG. 11]
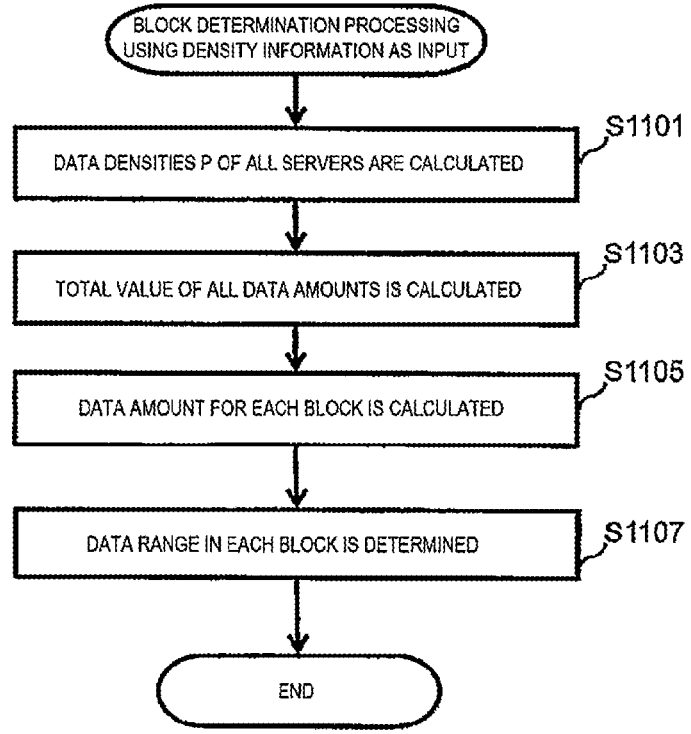

[FIG. 12]
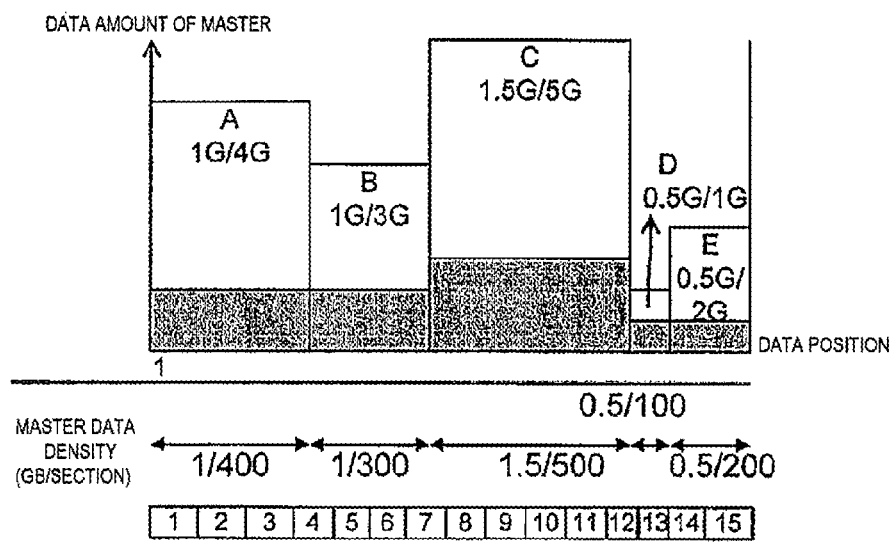

[FIG. 13]

| Name | A | B | C | D | E |
|---|---|---|---|---|---|
| Memory Size | 4GB | 3GB | 5GB | 1GB | 2GB |
| Data Size | 1GB | 1GB | 1.5GB | 0.5GB | 0.5GB |

(A)

| | 1 | | 400 | | 700 | | | 1200 | 1300 | 1500 |
|---|---|---|---|---|---|---|---|---|---|---|
| Master | A | | | B | | | C | | D | E |
| Replicate 1 | B | | C | | | D | E | | A | | B |
| Replicate 2 | C | D | E | | | A | | | B | | C |

(B)

| Block | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Master | A | | | | B | | | | C | | | | D | | E |
| Replicate 1 | B | | | C | | | D | | E | | | A | | | B |
| Replicate 2 | C | D | | E | | | A | | | | B | | | C | |

[FIG. 14]

| Control Panel | |
|---|---|
| Monitor / Setting | |

| Property Name | Value |
|---|---|
| Multiplicity | 3 |
| Block Count | 15 |
| Rebalance Threshold | 90 % |
| Block Partition Method | Distribution ▽ |
| Statistics Granularity | 50 |

Apply   Cancel

COMPUTER, CONTROL DEVICE FOR COMPUTER SYSTEM, AND RECORDING MEDIUM

TECHNICAL FIELD

The present invention relates to a system in which data is distributed to and arranged in a plurality of computers and, in particular, to a system in which master data and replicated data are distributed and arranged.

BACKGROUND ART

In recent years, a data amount has been explosively increased in a computer system for executing applications using Web, and there are known various systems for improving accessibility to data by distributing the data to a plurality of computers. For example, in an RDBMS (Relational DataBase Management System), there is known a method for improving accessibility of an entire system by partitioning data by predetermined ranges and arranging the partitioned data in a plurality of computers.

As a system for use in a cache server or the like, a NoSQL (Not only SQL) database is known, such as KVS (Key Value Store) for arranging, in a plurality of computer systems, cache data having an identifier (key) of the data and a data value (value) in accordance with a predetermined distribution method.

In the KVS, various configurations can be employed, such as a configuration for storing data in a volatile storage medium capable of accessing the data at a high speed, such as a main memory, a configuration for storing data in a nonvolatile recording medium having excellent persistence in storage of data, such as an SSD (Solid State Drive) and an HDD, and a configuration in which the both configurations described above are employed.

In the configuration in which the both configurations are employed, balance between a memory store configured by unifying memories of a plurality of computers and a disk store including a nonvolatile storage medium of at least one computer can be variously changed depending on various operation policies such as a policy in which high-speed accessibility is regarded as important and a policy in which a storage performance is regarded as important.

Data in which an identifier (key) of the data and a data value (value) are paired is stored in the memory store and the disk store.

In the KVS, a cluster is configured by a plurality of servers, and parallel processing is achieved by distributing data to the servers and arranging the data in the servers. Specifically, data in each data management range (hereinafter, referred to as "data range") managed by a corresponding server is stored in the server. Each server executes processing of the data (hereinafter, referred to as "master data", and, hereinafter, a data range of the master data is referred to as "master data range") included in the corresponding data range managed by the server. That is, in response to a reading request having a predetermined key, a server managing data in a data range having the key reads the data corresponding to the key. This makes it possible to improve performance of the parallel processing in the KVS by scale out.

In the KVS, in order to secure reliability of data, there is known a configuration in which a server configuring a cluster stores replicated data (hereinafter, referred to as "replicated data", and, hereinafter, a data range of the replicated data is referred to as "replicated data range") of data managed by another server. That is, each server is not only a master for managing data included in a predetermined data range but also a slave for holding replicated data of data managed by another server. With this, even in a case where failure occurs in a server, another server holding, as replicated data, data managed by this failed server as a master can continue processing. Thus, failure resistance can be secured.

PTL 1 discloses, as a method of holding master data in servers in the KVS described above, a technique in which increase in a load onto a single server is prevented by partitioning a master data range of a certain server and causing an adjacent server to hold the partitioned master data.

CITATION LIST

Patent Literature

PTL 1: JP-A-2012-48424

SUMMARY OF INVENTION

Technical Problems

However, in the technique described in PTL 1, there is no description regarding determination of data ranges of master data and replicated data to efficiently use memory capacities of the servers. For example, in a case where replicated data of master data having a large data amount in a server is held by a server having a small free memory capacity, page-out occurs, and it is necessary to access data stored in a disk. Therefore, speed performance for accessing the data is reduced. On the contrary, in a case where replicated data of master data having a small data amount in a server is held by a server having a large free memory capacity, an unused memory area is increased and a utilization ratio of a memory is reduced. Further, in a case where data amounts to be stored in the servers are changed in accordance with a usage situation of the servers, memories cannot be efficiently used in accordance with such change in the data amounts.

Solution to Problems

A representative embodiment of the invention is a computer, which is communicably connected to a plurality of computers having respective storage areas for storing data and in which second data that is replication of first data arranged in a storage area of own computer is arranged in storage areas of other computers, the computer holding capacities of the storage areas of the respective computers and determining first data ranges for arranging the first data in the storage areas of the own computer and the plurality of other computers in accordance with the capacities, arranging the second data in the storage areas of the own computer and the other computers by determining a second data range that is a largest data range or has a largest capacity, with, as a starting point, a data range that is different from a largest data range or a data range having a largest capacity in the first data ranges, and arranging the data in the storage areas of the respective computers in accordance with the first data ranges and the second data ranges.

Advantageous Effects of Invention

According to the invention, it is possible to improve speed performance and a memory utilization ratio of a system while maintaining failure resistance.

BRIEF DESCRIPTION OF DRAWINGS

FIG. 1 is a view illustrating a relationship between computers and corresponding data ranges managed by the respective computers as a precursor technique of a computer system to which the invention of the present application is applied.

FIG. 2 is a view illustrating outline of processing of a computer system of an embodiment to which the invention of the present application is applied.

FIG. 3 is a view illustrating an entire configuration of a computer system in a computer system of this embodiment.

FIG. 4A is a view showing an example of configuration information in a computer system of this embodiment.

FIG. 4B is a view showing an example of configuration information in a case where data is managed on a block basis in a computer system of this embodiment.

FIG. 4C is a view showing an example of server load information in a computer system of this embodiment.

FIG. 5 is a flowchart showing a flow of data range determination processing executed by a data range management unit in a computer system of this embodiment.

FIG. 6A is a flowchart showing a flow of data range determination processing based on data positions, which is executed by a machine information management unit in a computer system of this embodiment.

FIG. 6B is a view showing an example where data range determination processing based on data positions is executed in a computer system of this embodiment and data ranges of replicated data are determined.

FIG. 7 is a flowchart showing a flow of data range determination processing based on blocks, which is executed by a machine information management unit in a computer system of this embodiment.

FIG. 8A is a view showing an example where data range determination processing based on blocks is executed in a computer system of this embodiment and data ranges of replicated data are determined.

FIG. 8B is a view showing an example of configuration information of master data and replicated data corresponding to FIG. 8A in a computer system of this embodiment.

FIG. 9 is a flowchart showing data block determination processing using distribution information as input, which is executed by a machine information management unit in a computer system of this embodiment.

FIG. 10A is a view illustrating an example of block determination using distribution information as input in a computer system of this embodiment.

FIG. 10B is a view showing an example of configuration information of block Ins corresponding to FIG. 10A in a computer system of this embodiment.

FIG. 11 is a flowchart of block determination processing using density information as input, which is performed by a machine information management unit in a computer system of this embodiment.

FIG. 12 is an image of data block determination processing using density information as input in a computer system of this embodiment.

FIG. 13 is a view illustrating a display example of a user operation screen in a computer system of this embodiment.

FIG. 14 is a view illustrating a display example of a user setting screen in a computer system of this embodiment.

DESCRIPTION OF EMBODIMENTS

FIG. 1 is a view illustrating a relationship between computers and corresponding data ranges managed by the respective computers in a computer system that is an embodiment to which the invention is applied.

For example, FIG. 1 shows that, in a system including computers A to E, the computer B manages data in "400 to 700" as a master data range and manages data in "1401 to 1500" and "1 to 200" as replicated data ranges. As a method of distributing data to the computers, various methods, such as a Consistent Hashing method, a Range method, and a List method, are used.

FIG. 2 is a view simply illustrating outline of processing in an embodiment to which the invention is applied. In S101, master data ranges of respective servers are determined from a total data range. The master data ranges are determined based on memory capacity ratios of the servers.

In S102, a largest data range (hereinafter, referred to as "largest data range") is specified among the master data ranges held by the respective servers.

In S103, replicated data ranges held by the respective servers are determined based on the largest data range. In an embodiment to which the invention is applied, the replicated data ranges are determined based on data positions or data amounts.

FIG. 3 illustrates an entire configuration of a computer system that is an embodiment to which the invention is applied.

The computer system includes a plurality of servers 301, client devices 302, and networks 303. The servers 301 are connected to one another and the servers 301 and the client devices 302 are connected to one another via the network 303.

As the network 303, various wired and wireless configurations can be employed, such as a LAN, a WAN, and a SAN. In this embodiment, the network 303 may be any network as long as the network 303 can cause the servers 301 and the client devices 302 to communicate. Note that the network 303 includes a plurality of network devices. The network devices include, for example, a switch and a gateway.

The server 301 includes a processor 304, a main storage 305, and a secondary storage 306, and is a computer configuring KVS. Although not illustrated in this embodiment, the server 301 includes a network interface to be connected to the network 303. The server 301 executes reading processing and writing processing of data in response to a request from the client device 302 and returns results of the processing to a client. Note that all the servers 301 have the same configuration.

The processor 304 executes a program stored in the main storage 305. By executing the program, the processor 304 can realize a function that the server 301 has.

The main storage 305 stores a program to be executed by the processor 304 and information needed to execute the program.

In the main storage 305 of the this embodiment, programs for realizing a data management unit 307, a distribution control unit 308, a data range management unit 310, a configuration information holding unit 311, a machine information management unit 312, and a statistical information management unit 313 are stored. In the main storage 305, configuration information 314 and server load information 315 are further held.

A data store 316 that is a database configuring the KVS is further stored in the main storage 305. In the data store 316, data in which a key and a value are paired is stored.

The data management unit 307 controls various kinds of processing of data managed by the server 301. The data management unit 307 receives a request from the client device 302 and, in response to the request, controls processing such as reading and writing of data.

The distribution control unit 308 controls change in various setting items such as data multiplicity, the number of blocks of data, a memory threshold, and a determination method of data blocks. Such control is performed on a user setting screen illustrated in, for example, FIG. 14.

The data range management unit 310 manages storage locations of master data and replicated data to be stored in each server. The configuration information holding unit 311 manages the configuration information 314. The machine information management unit 312 executes data range determination processing of the replicated data. The statistical information management unit 313 acquires information on a load of each server 301 and renews the server load information 315 on the basis of the acquired information.

The client devices 302 transmit processing requests to the servers via the network. Note that a management terminal 309 is connected to the client devices 302 and a processing request is transmitted from the management terminal 309 in some cases.

A processor 317 executes a program stored in a main storage 318. In the main storage 318, the data management unit 307, the distribution control unit 308, the data range management unit 310, the configuration information management unit 311, the machine information management unit 312, and the statistical information management unit 313 are configured by cooperating a CPU and the programs. Hereinafter, in a case where processing is explained by using "program" as a subject, it is indicated that the program is executed by the processor 317.

FIG. 4 is schematic diagrams showing an example of the configuration information 314 and the server load information 315 managed as tables in the computer system. The configuration information 314 stores information on data ranges managed by the respective servers. Each of the servers may store the configuration information 314 illustrated in FIG. 4A and FIG. 4B or may store the configuration information 314 illustrated in any one of FIG. 4A and FIG. 4B.

The configuration information 314 of FIG. 4A has a server ID 401, a master data range 402, and a replicated data range 403.

The server ID 401 stores identifiers for uniquely identifying the servers. In the master data range 402, values indicating data ranges of the master data of the respective servers are stored. In the replicated data range 403, values indicating data ranges of the replicated data of the respective servers are stored.

The configuration information 314 of FIG. 4B is configuration information used in a case where data is managed as a single data set (hereinafter, referred to as "block") by combining a plurality of pieces of data. The configuration information 314 of FIG. 4B has a server ID 410, a block ID 411 of the master data, a data range 412 corresponding to the block ID 411, and a block ID 413 of the replicated data.

The server ID 410 and the data range 412 of the master data and the replicated data are similar to those of FIG. 4B. The block IDs 411 and 413 are identifiers for managing a plurality of pieces of data in combination. For example, it is indicated that data having the block ID 411 of "1" is configured by data "1 to 150" in the master data range 412.

The server load information 315 of FIG. 4C is a view showing an example of load information of the servers configuring the system. The server load information 315 has a server ID 420, a memory size 423, and a data size 425. The server load information 315 may further have information such as a CPU utilization rate and a network utilization rate of each server.

The server ID 420 stores identifiers for uniquely identifying the servers. The memory size 423 indicates memory capacities that the respective servers have.

The data size 425 indicates data amounts stored in the respective servers.

FIG. 5 is a flow showing entire processing of replicated data range determination. Note that the master data ranges have been determined in advance on the basis of the memory capacity ratios of the servers. In this embodiment, as a method of the data range determination processing, there are data range determination processing based on data and data range determination processing based on blocks.

In S501, the data range management unit determines whether or not the load information of the servers is stored. In a case where the load information of the servers is stored (S501: Yes), the processing proceeds to S503. In a case where the load information of the servers is not stored (S501: No), the processing proceeds to S507. By determining whether or not the load information of the servers is stored, whether the system is before operation or is being operated is grasped.

In S503, the data range management unit determines whether or not estimation of the data amounts to be processed in the respective servers is set. In a case where the estimation of the data amounts is set (S503: Yes), the processing proceeds to S507. In a case where the estimation of the data amounts is not set (S503: No), the processing proceeds to S505. The estimation of the data amounts means estimated values of the data amounts to be stored in the system.

In S505, the data range management unit executes data range determination processing based on data positions. Data range determination processing based on data ranges will be described in detail with reference to FIG. 6.

In S507, the data range management unit executes block determination processing. In this embodiment, as the block determination processing, block determination processing using distribution information as input or block determination processing using density information as input is performed. The block determination processing will be described in detail with reference to FIG. 9 and FIG. 11.

In S509, the data range management unit executes the data range determination processing based on the blocks. The data range determination processing based on the blocks will be described in detail with reference to FIG. 7.

In S511, the data range management unit shares configuration information of all machines in the system.

The data range determination processing based on the data can optimize the system also in a case where a data amount existing in a predetermined data position is indefinite, and therefore the data range determination processing based on the data is suitable mainly in a case where the data amounts to be stored in the servers are unpredictable, for example, before the system is operated. The data range determination processing based on the blocks can optimize the system in real time in accordance with the server load information 315, and therefore the data range determination processing based on the blocks is suitable mainly in a case where the data amount can be estimated during operation of the system.

FIG. 6 is views showing the data range determination processing based on the data positions. FIG. 6A shows a flow of the data range determination processing based on the data positions (S505 in FIG. 5).

In S601, the machine information management unit 312 calculates a memory amount ratio of each server. The memory amount ratio is a ratio of a memory capacity of own server to the memory capacities of all the servers.

In S603, the machine information management unit 312 determines whether or not a server having a memory amount ratio exceeding 1/multiplicity N exists. The multiplicity N is an index indicating how many pieces of the replicated data to be held in the system in order to improve the reliability and the failure resistance of the data. By limiting the memory amount ratio to 1/multiplicity N, it is possible to achieve multiplexing without overlapping, in the same server, data ranges of the master data and the replicated data of the master even in a case where a difference in memory performance between the servers is large.

In a case where the server having the memory amount ratio exceeding 1/multiplicity N exists (S603: Yes), the memory amount is corrected in S605 so that the memory amount ratio becomes 1/N or less. This correction of the memory amount is performed in such a manner that the machine information management unit 312 changes the ratio of the server having the memory amount ratio exceeding 1/multiplicity N to 1/multiplicity N and allots data of an insufficient memory amount to another server. In a case where the server having the memory amount ratio exceeding 1/multiplicity N does not exist (S603: No), the processing proceeds to S606.

In S606, the data range management unit 312 determines the master data range of each server in accordance with the memory amount ratio.

In S607, the data range management unit 312 specifies a largest data range and a server ID having the largest data range among all the servers by referring to a master data range 612 of the configuration information 314.

In S609, the data range management unit allots leading data in the largest data range, as leading data in a replicated data range, to a server having a server ID subsequent to the server ID having the largest data range.

For example, as illustrated in FIG. 6B, among the data ranges of the master data stored in the servers A to E, a data width "500" in a master data range "701 to 1200" is specified as the largest data range in the master data range 612. A server ID 610 having the largest data range is specified as "C". Then, master data "701" that is leading data in the largest data range is allotted, as the leading data in the replicated data range, to a server ID "D" that is a server ID subsequent to the server ID "C" having the largest data range. Note that, in this embodiment, the server IDs are managed in descending order, but may be managed in ascending order.

FIG. 7 shows a flow of the data range determination processing based on the blocks.

In S701, the machine information management unit 312 calculates the memory amount ratio of each server. The memory amount ratio is a ratio of a memory capacity of the own server to the memory capacities of all the servers.

In S703, the machine information management unit 312 determines whether or not a server having a memory amount ratio exceeding 1/multiplicity N exists. In a case where the server having the memory amount ratio exceeding 1/multiplicity N exists (S703: Yes), the machine information management unit 312 corrects the memory amount in S705 so that the memory amount ratio is 1/multiplicity N or less. This correction of the memory amount is achieved by allotting data so that the ratio of the server having the memory amount ratio exceeding 1/multiplicity N is changed in the same way as the data range determination processing based on the data positions. In a case where the server having the memory amount ratio exceeding 1/multiplicity N does not exist (S703: No), the processing proceeds to S707.

In S707, the data range management unit allots blocks to each server in accordance with the memory amount ratio, thereby determining the master data range. Note that the block determination processing will be described in detail with reference to FIG. 9 (block determination method using distribution information as input) and FIG. 11 (block determination method using density information as input).

In S709, the data range management unit 312 specifies a server having a largest data capacity among all the servers in the system and specifies the number of blocks (hereinafter, referred to as "largest block number") held by the server.

In S711, the data range management unit 312 shifts the master data range of each server by the largest block number.

In S713, the data range management unit 312 calculates a data range of allotted blocks. In the data range, an initial point of an allotted leading block serves as a starting point in the data range, and a terminal point of a last block serves as an end point in the data range.

FIG. 8 shows a relationship between data storage locations that have been subjected to the data range determination processing based on the blocks and stored data. FIG. 8A shows a view in which the replicated data ranges are determined by the data range determination processing based on the blocks. In this embodiment, the master data ranges are determined by determining blocks having the same data amount in a total data range and allotting a plurality of blocks to each server in accordance with the memory amount ratio (S707 in FIG. 7).

For example, it is shown that data of the block IDs 8 to 12 is stored as master data in the server C of FIG. 8A. Then, the server C having the largest data capacity is specified among all the servers, and the largest block number held by the server C is specified to "5" (S709 of FIG. 7). Thereafter, the number of blocks of the replicated data ranges is shifted by "5" blocks that are the largest block number from the master data ranges of the respective servers. In the server C, data of the block IDs 3 to 7 is stored as the replicated data. In the same procedure, data ranges of replicated data 2 are determined, thereby achieving the multiplexing. FIG. 8B shows the configuration information 314 of the master data and the replicated data retained by the servers corresponding to FIG. 8A. Hereinafter, the block determination method will be described.

FIG. 9 is a flow showing the data block determination processing using the distribution information as input.

In S901, the machine information management unit 312 calculates an accumulated value of data amounts in the system on the basis of the server load information 315.

In S903, the machine information management unit 312 calculates, on the basis of the calculated accumulated value of the data amounts, data positions for equally dividing the data amounts by the number of blocks X designated by a user. Note that the number of blocks of the data can be arbitrarily set by a user.

In S905, the machine information management unit 312 determines a data range for each block.

FIG. 10 is images of the block determination processing using the distribution information as input.

As illustrated in FIG. 10A, a relationship between the data positions and the data amounts is shown by a bar graph, and the accumulated value of the data amounts in the system is shown by a line graph. FIG. 10A illustrates a state in which the blocks are determined by dividing the accumulated value of the data into 15 equal parts in order to generate "15" data blocks having the same data amount.

FIG. 10B is a table showing correspondence between the blocks shown in FIG. 10A and data ranges.

As described above, in the block determination processing using the distribution information as input, the blocks are determined based on the accumulated value of the data amounts in the system, and therefore this block determination method is particularly effective in a case where actual data amounts in the system can be grasped or in a case where the data amounts can be estimated.

FIG. 11 shows a flow of the block determination processing using the density information as input. FIG. 12 shows an image of the data block determination processing using the density information as input.

In S1101, the machine information management unit calculates data densities p of all the servers. The data density p is obtained by calculating "master data amount of each server/master data range of each server". The density p of the server A in FIG. 12 is 1 GB/400.

In S1103, the machine information management unit 312 calculates a total value of a total data amount of the servers existing in the system. In the system illustrated in FIG. 12, the total data amount stored in the servers A to E are now 1 GB+1 GB+1.5 GB+0.5 GB+0.5 GB=4.5 GB.

In S1103, the machine information management unit 312 calculates a data amount for each block. The number of blocks of data can be arbitrarily set by a user. In a case where the data is partitioned into "15" blocks in the system of FIG. 12, a data amount for each section is 0.3 GB by calculating the total data amount 4.5 GB/15 blocks.

In S1105, the machine information management unit 312 determines a data range for each block. The data range is calculated on the basis of the data density p of each server and the data amount for each block. For example, in a case where the data density p of the server A is 1 GB/400 and the data amount for each block is 0.3 GB, the data range is "0.3 GB/(1 GB/400)=120".

In S1107, the machine information management unit 312 determines a data range width of each server.

The data block determination processing in which the data density information is used is particularly suitable in a case where data is equally arranged in the servers and a data amount for each piece of data is substantially the same.

FIG. 13 is an explanatory view illustrating a display example of a user operation screen in this embodiment. The user operation screen includes a table showing the server load information in the system and a schematic diagram showing the data managed by the servers as the master data or the replicated data.

In the table showing a server load state, the memory capacities and the data amounts of the respective servers in the system are included.

In a case where the replicated data ranges are determined based on the data positions, the data schematic diagram shows the data ranges as in (A). In a case where the replicated data ranges are determined based on the data blocks, locations of the master data and the replicated data of each server are shown on a data block basis as in (B).

FIG. 14 is an explanatory view illustrating a display example of a user setting screen of this embodiment. The user setting screen has data multiplicity, the number of blocks of data, a memory threshold, a determination method of data blocks and the partitioned data number.

In the data multiplicity, multiplicity of holding the data in the system is set. The number of blocks of the data is for designating the number of blocks in a case where the data range determination processing of the replicated data is performed based on the blocks.

The memory threshold is an index for performing rebalance of the data in accordance with memory loads of the servers during operation of the system.

In this embodiment, it is possible to select, as the block determination method, at least the block determination method using the distribution information of data as input or the block determination method using the density information of data as input.

As described above, according to an embodiment of the invention, the replicated data ranges can be determined based on the master data ranges in accordance with the load state of the servers. Therefore, even in a case where a cluster includes servers having different performance, it is possible to prevent a server having low performance from being a bottleneck of the system.

Because it is possible to achieve the multiplexing without overlapping the master data ranges and the replicated data ranges, the reliability of the system can be secured.

By determining the blocks of the data using the distribution information and the density information of the system as input, the replicated data range can be determined in accordance with the load state of the servers. This makes it possible to efficiently use memories.

Note that various kinds of software exemplified in this embodiment can be stored in various (non-transitory) recording media, such as electromagnetic, electronic, and optical media, and can be downloaded to a computer via a communication network such as Internet.

In this embodiment, an example where control is performed by software has been described. However, a part thereof can be also realized by hardware.

In the above description, although the computer system has been described in detail with reference to the drawings, the invention is not limited to various examples described above, and, as a matter of course, the various modifications can be made within the scope of the invention.

REFERENCE SIGNS LIST 301 server
302 client device
303 network
304, 317 processor
305, 318 main storage
306, 319 secondary storage
307 data management unit
308 distribution control unit
309 management terminal
310 data range management unit
311 configuration information holding unit
312 machine information management unit
313 statistical information management unit
314 configuration information
315 server load information
316 data store

The invention claimed is:

1. A control apparatus for a computer system, in which a plurality of computers having respective storage areas for storing data are communicably connected and in which the storage areas in which first data is arranged and the storage areas in which second data which is replicated data of the first data is arranged are included in different computers, the control apparatus comprising:
 a memory configured to hold capacities of the storage areas of the plurality of computers;

a processor configured to determine first data ranges for arranging pieces of the first data in the storage areas of the plurality of computers in accordance with respective capacities of the plurality of computers;

the processor configured to determine second data ranges for arranging the second data in the storage areas of the plurality of computers by determining a data range of the second data, the data range being a largest data range or having a largest capacity in the first data ranges;

the processor configured to arrange the data in the storage areas of the respective computers in accordance with the first data ranges and the second data ranges;

the processor configured to calculate a total data size of the data held by all the computers on the basis of a data size for each piece of the data and the number of the pieces of the data;

the processor configured to calculate data densities of the respective computers on the basis of the capacities of the respective computers and the first data ranges;

the processor configured to generate data blocks by combining a plurality of pieces of the data by determining a data size for each data block on the basis of the total data size and the data densities and generating the data blocks having a same data size on the basis of the total data size and the number of the data blocks;

the processor configured to allot the data blocks to the computers in accordance with the capacities of the storage areas of the respective computers; and the processor configured to determine a largest data size on the basis of the number of the allotted data blocks.

2. The control apparatus according to claim 1, wherein the processor of the control apparatus is configured to:

manage computer IDs of the computers, determine the first data ranges for arranging the data in the computers in order of the computer IDs in accordance with the respective capacities of the plurality of computers, and determine the second data ranges for arranging the second data in the computers in order of the computer IDs on the basis of the largest data range or the data range having the largest capacity in the first data ranges, such that a lead of a data range arranged in a first computer, having the largest data range or the largest capacity in the first data ranges, becomes a lead of a data range of data to be allotted to a computer subsequent to the first computer in order of the computer IDs.

3. The control apparatus according to claim 1, wherein the processor of the control apparatus is configured to arrange key-value type data in the storage areas.

4. A computer including the control apparatus of claim 1 that is one of the plurality of computers.

5. The computer according to claim 4, wherein the processor of the control apparatus is configured to:

manage computer IDs of the computers, determine the first data ranges for arranging the data in the computers in order of the computer IDs in accordance with the respective capacities of the plurality of computers, and determine the second data ranges for arranging the second data in the computers in order of the computer IDs on the basis of the largest data range or the data range having the largest capacity in the first data ranges, such that a lead of a data range arranged in a first computer, having the largest data range or the largest largest capacity in the first data ranges, becomes a lead of a data range of data to be allotted to a computer subsequent to the first computer in order of the computer IDs.

6. The computer according to claim 4, wherein the processor of the control apparatus is configured to arrange key-value type data in the storage areas.

7. A non-transitory computer-readable recording medium storing a program for causing a control apparatus for a computer system in which a plurality of computers having respective storage areas for storing data are communicably connected and in which the storage areas in which first data is arranged and the storage areas in which second data which is replicated data of the first data is arranged are included in different computers, to execute a step of holding capacities of the storage areas of the respective computers and determining first data ranges for arranging pieces of the first data in the storage areas of the plurality of computers in accordance with respective capacities of the plurality of computers, a step of determining second data ranges for arranging the second data in the storage areas of the plurality of computers by determining a data range of the second data, the data range being a largest data range or having a largest capacity, with, as a starting point, a data range that is different from a largest data range or a data range having a largest capacity in the first data ranges, a step of arranging the data in the storage areas of the respective computers in accordance with the first data ranges and the second data ranges, a step of calculating a total data size of the data held by all the computers on the basis of a data size for each piece of the data and the number of the pieces of the data;

a step of calculating data densities of the respective computers on the basis of the capacities of the respective computers and the first data ranges;

a step of generating data blocks by combining a plurality of pieces of the data including determining a data size for each data block on the basis of the total data size and the data densities and generating the data blocks having a same data size on the basis of the total data size and the number of the data blocks;

a step of allotting the data blocks to the computers in accordance with the capacities of the storage areas of the respective computers; and a step of determining a largest data size on the basis of the number of the allotted data blocks.

* * * * *